March 31, 1925.          1,531,594
A. T. CAROZZA ET AL
SYSTEM OF CONCRETE MIXING AND APPARATUS FOR PERFORMING THE SAME
Filed April 2, 1924

Patented Mar. 31, 1925.

1,531,594

UNITED STATES PATENT OFFICE.

ANTONIO T. CAROZZA, OF BALTIMORE COUNTY, JOHN H. SMITH AND JOHN F. WICH, OF BALTIMORE, MARYLAND.

SYSTEM OF CONCRETE MIXING AND APPARATUS FOR PERFORMING THE SAME.

Application filed April 2, 1924. Serial No. 703,610.

*To all whom it may concern:*

Be it known that we, ANTONIO T. CAROZZA, a citizen of the United States, and a resident of Baltimore County, in the State of Maryland, JOHN H. SMITH, a citizen of the United States, and a resident of Baltimore city, in the State of Maryland, and JOHN F. WICH, a citizen of the United States, and a resident of Baltimore city, in the State of Maryland, have invented a new and useful System of Concrete Mixing and Apparatus for Performing the Same.

The object of our invention is the providing an improved system of assembling, mixing and conveying aggregates forming grout or concrete.

A further object of our invention is an improved method of mixing component aggregates of concrete wherein one or more aggregates are co-mingled with water in an operation separate from and prior to a final mixing operation with remaining aggregates.

A further object of our invention is an improved method of mixing component aggregates of concrete wherein an integral water-proofing agent, cement and sand if desired, are thoroughly co-mingled with water in an operation separate from and prior to a final mixing operation with remaining aggregates.

A further object of our invention is an improved mixing appliance and means of introducing the component parts to be mixed therein.

A further object of our invention is an improved means of mixing and conveying ingredients to form the concrete.

With the foregoing and other objects in view, our invention consists of the methods employed, combination and arrangement of system, apparatus and means as hereinafter specifically described, and in the accompanying drawings are shown the preferred embodiment of a machine for carrying out our invention, but it is understood that changes, variations and modifications may be resorted to which come within the scope of the claims hereunto appended.

Figure 1:
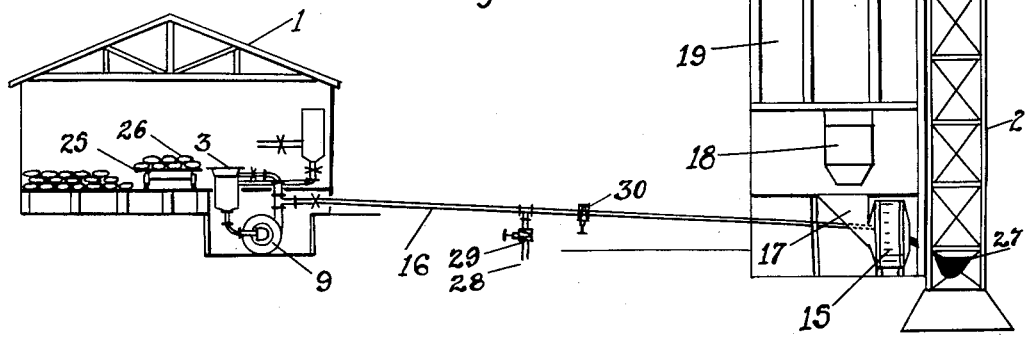
Figure 2:
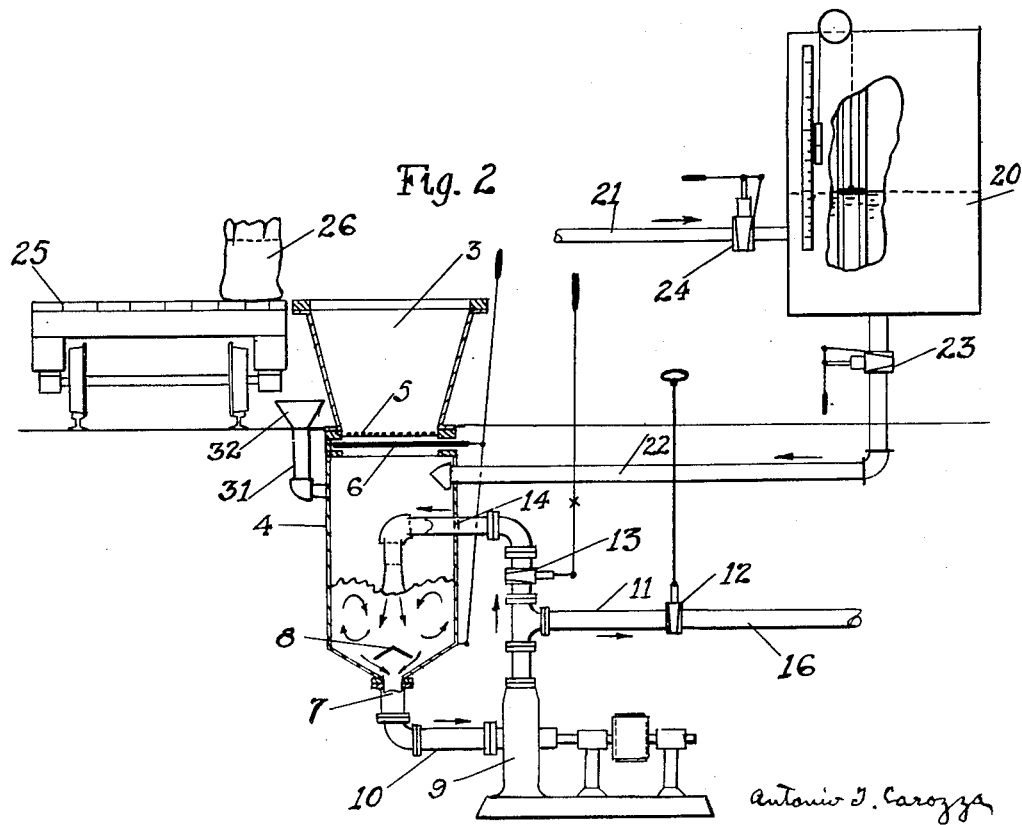

To fully understand our system and apparatus we have shown in Fig. 1 a view in elevation of a plant layout showing a cement storage shed and its relative position with reference to the final mixing plant and hoist; and in Fig. 2 an enlarged view of the apparatus used for the pre-mixing of certain ingredients as may be desired.

Similar numerals refer to similar parts throughout the several views.

1 is a cement storage shed; 2 is the hoist tower; 3 is the receiving hopper over the mixing chamber 4. Between receiving hopper 3 and hydrating chamber 4 is screen 5 and gate 6 to control the discharge from the hopper. At or near the bottom of hydrating chamber 4 is outlet 7, which has preferably baffle 8 near its opening to agitate the contents of the chamber in the vicinity of the outlet; this, however, is not important; it is desirable, however, that there be a free and unobstructed peripheral discharge of chamber 4 to keep the same clean, free of sedimentation, and in good working order. When a liquid constitutes one of the aggregates, or ingredients, passing the same through screen 5 is not desirable, and an admission pipe 31 is provided leading from fluid hopper 32 into hydrating chamber 4.

9 is a pump, preferably of the centrifugal type, for circulating and forcing the hydrating and hydrated aggregates, and is connected to outlet 7 by a suction pipe 10 and to the main-line discharge 11 which latter discharge is provided with gate-valve 12 to control the discharge, said pump also being connected through control valve 13 back into the mixing chamber 4 by pipe 14, thus permitting a closed agitating cycle with valve 12 closed and valve 13 open.

15 is a concrete mixer conveniently located with reference to the coarse aggregates, such as gravel, and the like, and with reference to the hoist, conveyors, or the layout of the job. 16 is the conveyor pipe connecting the main line discharge 11 with the concrete mixer, and may be of any desired length as required by the location of the storage shed and of the concrete mixer and work to be grouted, the former often depending upon transportation facilities, and the mixer is located depending upon conditions peculiar to the job. Where grouting, cement washing, or other forms of liquid cement is used, branches with proper control valves are inserted in pipe conveyor 16, as shown at 28, which is a branch controlled by valve 29 and stop valve 30.

17 is the batch hopper on the concrete mixer, which is fed from the measuring-boxes 18 which in turn is supplied from the storage bins 19.

20 is the water tank, which is for convenience graduated and provided with an inlet supply 21 and an outlet discharge 22 controlled by valve 23. 24 is the inlet valve in inlet supply 21. Discharge 22 is connected into hydrating chamber 4.

In the plant layout shown the cement is brought in on cars 25, preferably in proximity to hopper 3 for convenience in unloading. 26 are measured bags of cement, or other ingredients desired.

The operation of our invention is as follows:

A pre-determined amount of ingredients, 26, is dumped into hopper 3. The requisite amount of water from water-tank 20 is admitted into mixing chamber 4, the pump 9 is continuously operated, valve 12 being closed and valve 13 being open, a violent circulation into, through and out of mixing chamber 4 of the water measured and permitted to enter the same takes place; gate 6 is opened and the measured amount of ingredients supplied from the hopper 3 are admitted and violently co-mingled with the circulating water. When desired valve 12 is opened and valve 13 closed, and the batch is forced through pipe 16 to the work to be grouted or to concrete mixer 15, in the latter case preferably slightly before the admission of a pre-determined amount of the coarser aggregates from batch-hopper 17 which have been previously measured in measuring-box 18. After proper mixing the concrete mixer is dumped in the ordinary way as shown at 27 and the concrete conveyed therefrom.

By means of proper signals and timing the mixing, circulating, measuring, co-mingling, etc., are accomplished at the proper time to insure smooth and continuous operation of the plant. In the specification when we use the term aggregates we mean any substance, solid or fluid, which may be desired in the work. In this specification and claims when we use the term "grout", we mean any hardening coating or filling material such as a mixture of cement and water with or without other ingredients, such as sand, gravel, water proofing material, color, etc.

Having thus described our invention, what we claim and desire to secure by Letters Patent is:

1. The process of hydrating cementitious materials, consisting of circulating a fluid aggregate in a cycle mainly closed, and while so circulating adding the aggregate to be hydrated into the circulation, and continuing the circulation drawing from the densest part of the aggregation, thus intimately associating the aggregates thus assembled.

2. The process of hydrating cementitious materials consisting of, assembling together said materials operated upon and when so assembled circulating the same in a cycle partly within a container and continuing the circulation drawing from the densest part of the aggregation and partly without said container and positively operated until the necessary association is complete.

3. An improved method of making concrete consisting in, first hydrating the cement in connection with a cyclic current of water, then mixing the hydrated cement with sand and gravel or such other materials.

4. A hydrating chamber provided with a free and un-obstructed peripheral discharge to the suction of a pump said hydrating chamber being also provided with means of introducing dry cementitious materials into the body of a fluid contained in said chamber and means for admitting a fluid to said chamber, a pipe line, and a pump located between said hydrating chamber and said pipe line said pump adapted to either circulating the hydrating cement through said hydrating chamber or to force said hydrated cement into said pipe line said pump being connected to said discharge.

5. A hydrating mixer comprising a hydrating chamber, provided with a free and un-obstructed peripheral discharge to the suction of a pump, a circulating pump connected to said discharge, and means for connecting the suction and discharge of said pump simultaneously to said mixing chamber, and a discharge pipe connected to the discharge side of said pump and means for controlling the discharge with reference to the discharge pipe and the said hydrating chamber.

6. A hydrating mixer comprising, a hydrating chamber, provided with a free and un-obstructed peripheral discharge to the suction of a pump, a circulating pump connected to said discharge, a mixing chamber, means for connecting the suction and discharge of said pump simultaneously to said hydrating chamber, and means for admitting definite quantities of fluid and un-hydrated aggregates as desired to said hydrating chamber.

7. A mixer, comprising an upright, substantially cylindrical hydrating chamber having an outlet near its bottom and a baffle over said outlet providing a free and un-obstructed peripheral opening between said baffle and said hydrating chamber, a pump pipe discharging in the upper end of said hydrating chamber, said pump having conduit connections with said pipe and the hydrating chamber, and a mixing chamber having conduit connections with said pump.

8. A mixer, comprising an upright, substantially cylindrical hydrating chamber having an outlet, a pipe discharging in the upper end of said hydrating chamber, a hopper surmounting said hydrating chamber, and a pumping means connecting a baffle over said outlet, providing a free and un-obstructed peripheral opening between said baffle and said hydrating chamber, said outlet and the said pipe discharging in the upper part of said chamber.

9. A method of mixing concrete consisting of hydrating cement by cycling the same with a fluid then forcing said hydrated cement to a place of mixture, then mixing said hydrated cement with the other aggregates.

10. A method of mixing and conveying concrete materials, which consists in mixing a liquid with a pulverulent ingredient to produce a freely flowing slurry; forcing said slurry in a conveyor to flow to a distant point; adding a coarser ingredient to said slurry at this point, and then mixing the aggregates of said slurry and said coarser ingredient at said point.

ANTONIO T. CAROZZA.
JOHN H. SMITH.
JOHN F. WICH.

Witnesses:
EDWARD P. REYNOLDS,
WALTER R. HEATH.